(12) United States Patent
Al-Anzi

(10) Patent No.: US 8,413,966 B1
(45) Date of Patent: Apr. 9, 2013

(54) WATER AERATION SYSTEM USING RENEWABLE ENERGY SOURCE

(76) Inventor: Bader Shafaqa Al-Anzi, Safat (KW)

( * ) Notice: Subject to any disclaimer, the term of this patent is extended or adjusted under 35 U.S.C. 154(b) by 0 days.

(21) Appl. No.: 13/585,230

(22) Filed: Aug. 14, 2012

Related U.S. Application Data

(63) Continuation of application No. 13/354,184, filed on Jan. 19, 2012.

(51) Int. Cl.
  *B01F 3/04* (2006.01)
(52) U.S. Cl. ........ 261/30; 261/120; 261/121.1; 261/123
(58) Field of Classification Search ............ 261/30, 261/120, 121.1, 123; 210/242.2
  See application file for complete search history.

(56) References Cited

U.S. PATENT DOCUMENTS

| | | | | |
|---|---|---|---|---|
| 4,657,675 A | * | 4/1987 | Zan | 210/170.02 |
| 4,892,688 A | * | 1/1990 | Bernhardt | 261/24 |
| 4,906,359 A | * | 3/1990 | Cox, Jr. | 210/170.02 |
| 5,336,399 A | * | 8/1994 | Kajisono | 210/170.02 |
| 5,549,828 A | * | 8/1996 | Ehrlich | 210/602 |
| 5,565,096 A | * | 10/1996 | Phelan | 210/150 |
| 7,118,678 B2 | * | 10/2006 | Porat | 210/748.19 |
| 7,678,266 B2 | * | 3/2010 | Sun et al. | 210/170.05 |
| 2003/0127754 A1 | * | 7/2003 | Ruzicka et al. | 261/93 |
| 2010/0320626 A1 | * | 12/2010 | Chen | 261/35 |

* cited by examiner

*Primary Examiner* — Charles Bushey
(74) *Attorney, Agent, or Firm* — Richard C. Litman

(57) ABSTRACT

The water aeration system using a renewable energy source is a self-contained unit having a float and a perforated diffuser plate positioned below the float. An electrically powered air pump is installed atop the structure, and a device for collecting renewable energy also extends above the structure. The renewable energy collection device may be one or more solar panels or a wind generator or wind turbine. The pump draws ambient air in through an inlet and pumps the air down through a supply tube to escape from a nozzle below the diffuser plate. The air then bubbles up through the water, the bubbles being broken up by the small perforations of the diffuser plate to provide efficient aeration of the water. An electrical storage battery and auxiliary power receptacle may be provided to power the pump motor during periods when solar or wind power is not available.

16 Claims, 4 Drawing Sheets

WATER AERATION SYSTEM USING RENEWABLE ENERGY SOURCE

CROSS-REFERENCE TO RELATED APPLICATIONS

This is a continuation of my prior application Ser. No. 13/354,184, filed Jan. 19, 2012 now pending.

BACKGROUND OF THE INVENTION

1. Field of the Invention

The present invention relates generally to water treatment systems, and particularly to a water aeration system using a renewable energy source as the power source for an aeration pump.

2. Description of the Related Art

The contamination of various bodies of water by various means is an increasingly serious problem worldwide. Perhaps the most widespread contaminants are organic materials that enter the water system due to pollution from human habitation, either directly or indirectly, e.g., pollution from farms and the like. Such pollution can affect inland fresh water supplies (lakes and rivers), and can also be carried to the sea by inland rivers and waterways or by direct discharge of sewage and/or other pollutants into the sea. Organic material in the sewage of treatment plants is another example of such pollution, albeit contained for processing. The biochemical processes that occur in water due to such organic pollution are known to decrease the oxygen content of the water, thereby reducing or perhaps even destroying fish and other aquatic life in the contaminated body of water. Even if some fish remain in the polluted water, they are almost certainly unfit for human consumption, if caught.

It is generally considered that the most effective means of eliminating such pollutants in contaminated water is by bacteriological processing, wherein bacteria process the contaminants to break them down into harmless organic materials. However, such bacteria are aerobic, i.e., they require oxygen for their metabolism. This is well known in the sewage treatment field, where water is commonly treated by aeration after solids are removed by settling or other means. Such aeration is generally accomplished by mechanical means, e.g., pumping the water up for dispensing into the air from spray booms and nozzles, or by forcing air through underwater pipes for the air to bubble up through the water. Such mechanical systems are relatively costly to operate and require relatively high energy and manpower costs. Even if such systems were less costly to operate, a huge drawback is that they cannot be readily transported to a pollution site for operation at that site. Rather, the water must be transported to the location of the aeration system, a process that is clearly unworkable on a very large scale and/or over very long distances.

Thus, a water aeration system using a renewable energy source solving the aforementioned problems is desired.

SUMMARY OF THE INVENTION

The water aeration system using a renewable energy source includes a structure supported by a float and a perforated diffuser plate supported by the structure beneath the surface of the water. The superstructure extending above the float and the surface of the water includes an electrically powered air pump installed thereon, and means for collecting and supplying electrical energy to the pump extending above the structure and pump. The energy collection and supply means may comprise a series of solar panels, or a wind turbine or generator. The air pump draws air in through an inlet and pumps the air downward through a central tube or pipe to an outlet nozzle below the diffuser plate. The air then flows from the nozzle, up to the diffuser plate to be broken up into myriad small bubbles for efficient aeration.

The above-described apparatus generally needs no other source of power for its operation other than the solar or wind energy provided by the solar panels or wind generator. However, a storage battery may be provided to supply power when solar or wind power is not available. The battery may also provide power to an indicator light atop the structure. The system may include a power receptacle to allow it to be powered from an external power supply.

The superstructure of the device may include depth indicators to indicate the buoyancy of the apparatus. While the buoyancy of the system would not likely change to any great extent during operation, in some cases the buoyancy could change if the float is damaged in some manner. Such depth or buoyancy indicators would thus serve to show the integrity of the float, i.e., to alert observers if the float is damaged in some manner. A small propulsion unit may be provided to navigate the structure to a different area, power being supplied by the on-board battery and navigation by a preprogrammed on-board controller or remotely controlled by an operator, as desired.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
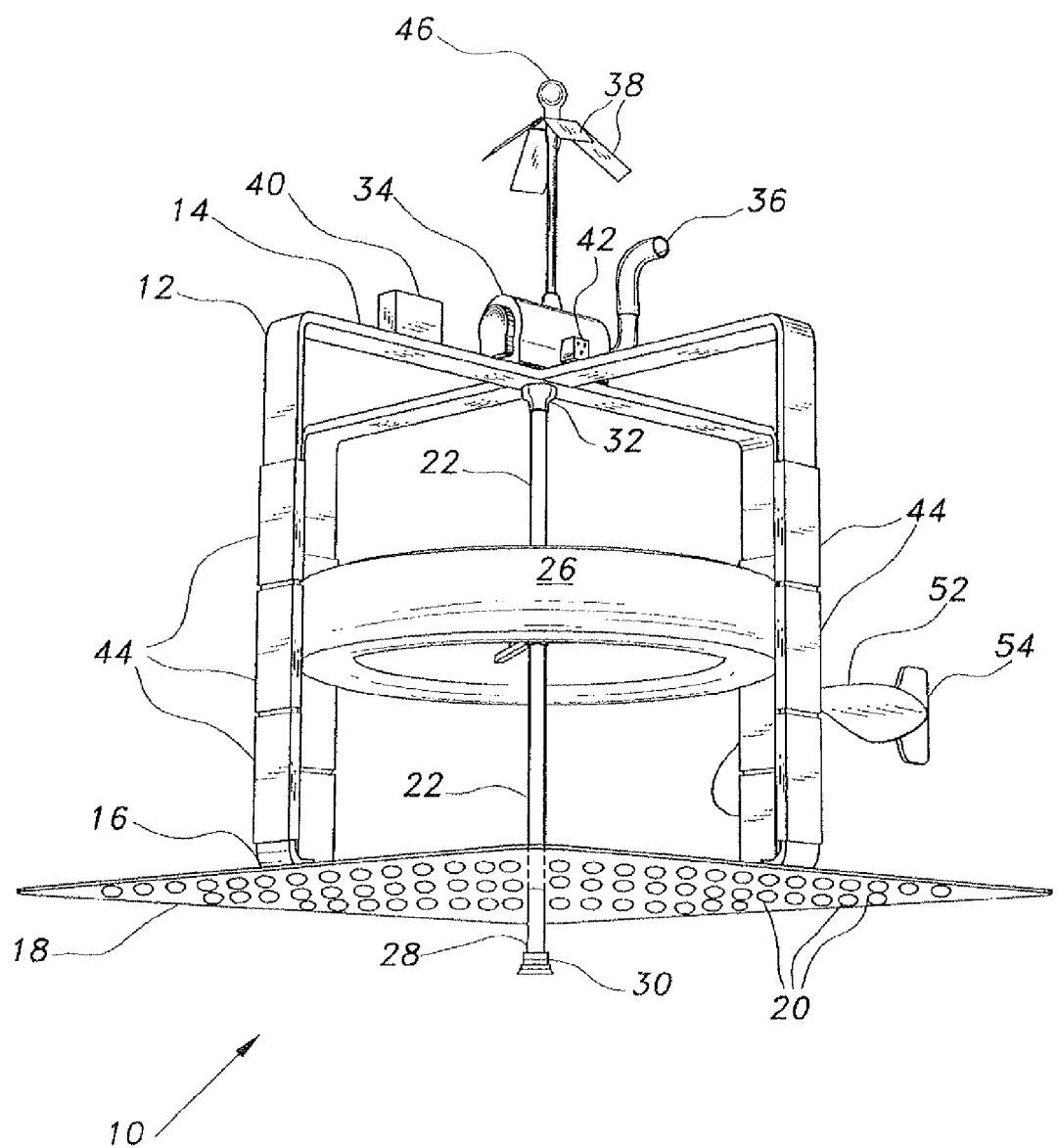
FIG. 1 is a perspective view of a first embodiment of a water aeration system using a renewable energy source according to the present invention, wherein the power source comprises one or more solar panels.
Figure 2:
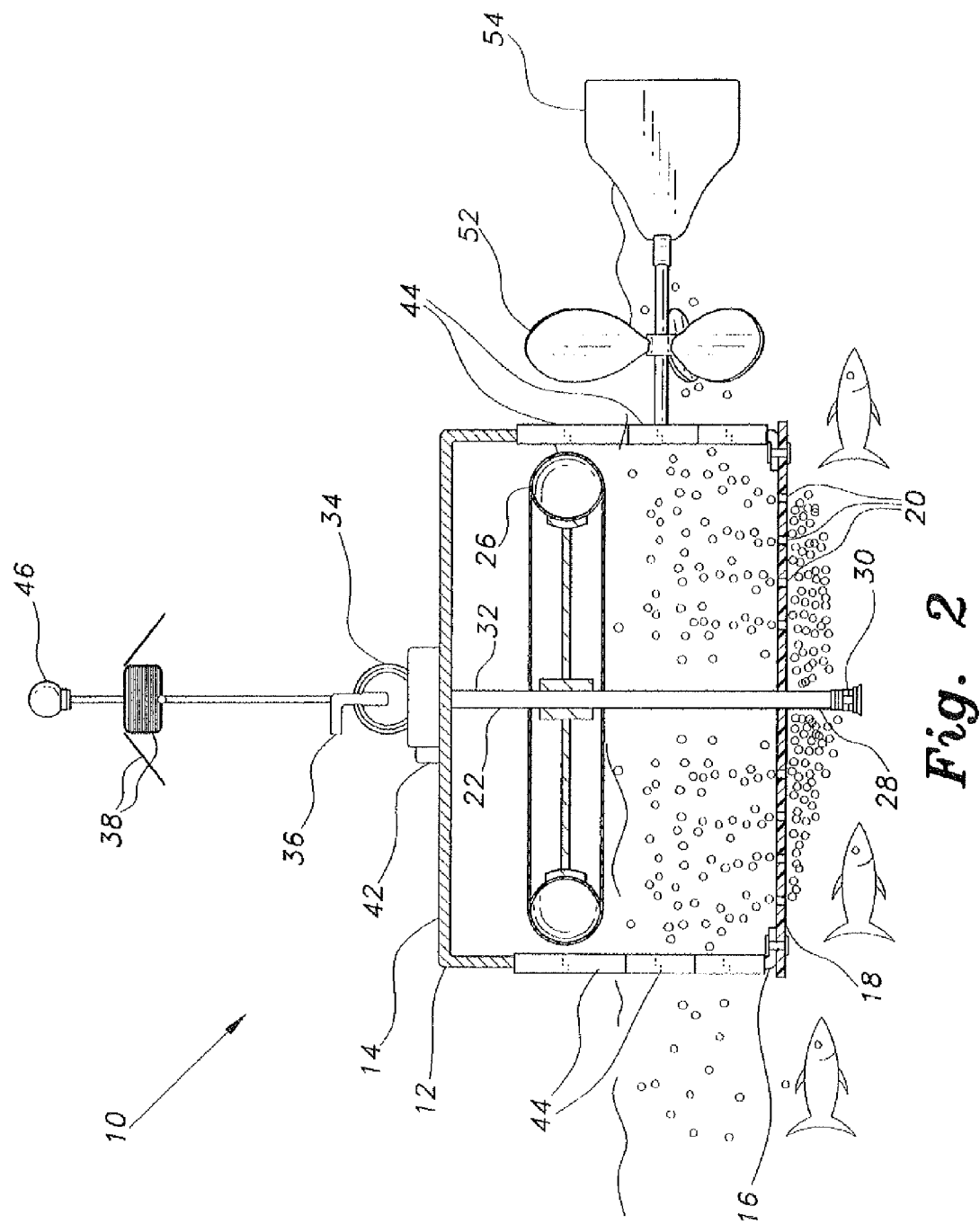
FIG. 2 is a side elevation view in section of the water aeration system of FIG. 1, illustrating its internal structure.
Figure 3:
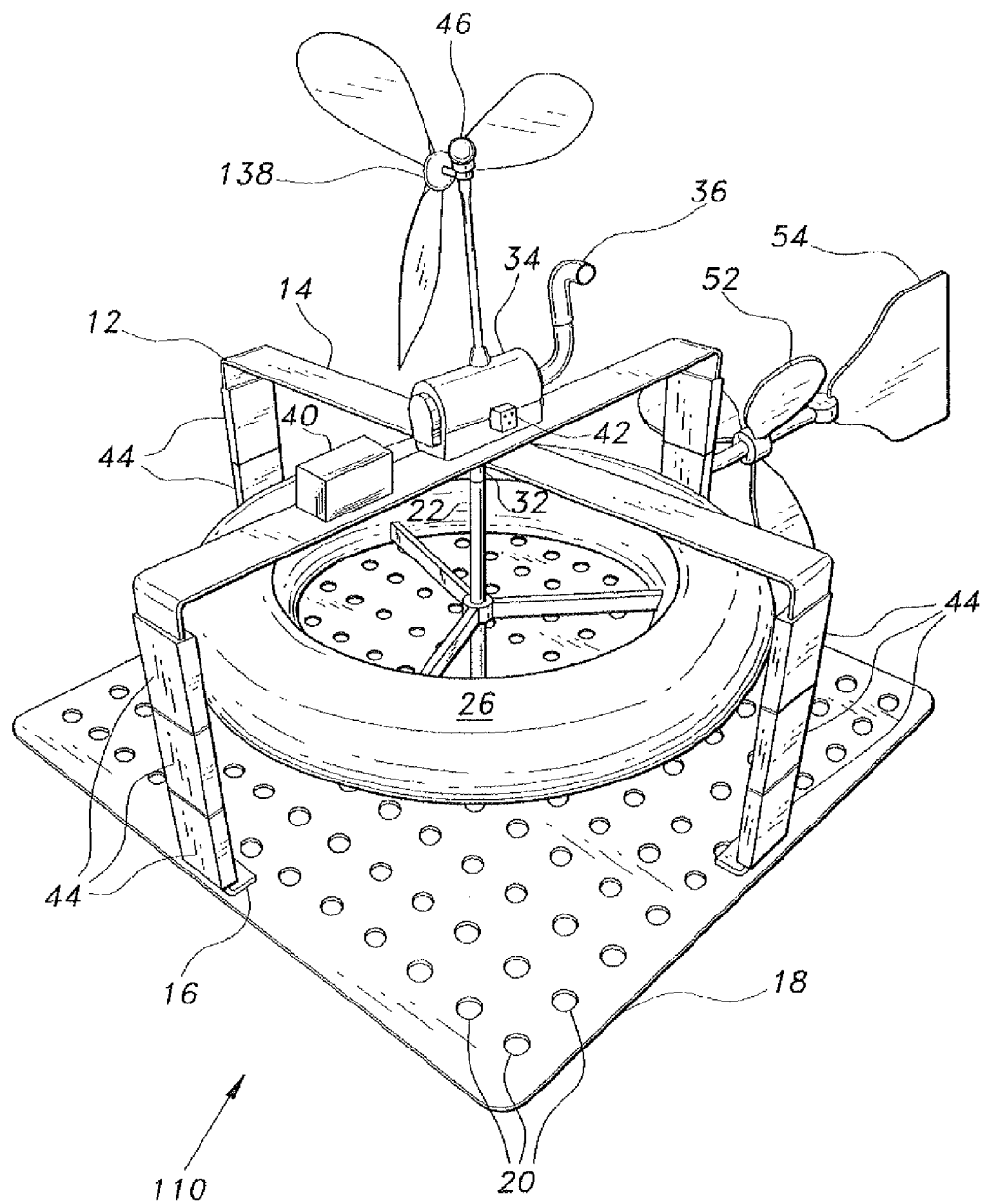
FIG. 3 is a perspective view of a second embodiment of a water aeration system using a renewable energy source according to the present invention, wherein the power source comprises a wind generator or turbine.
Figure 4:
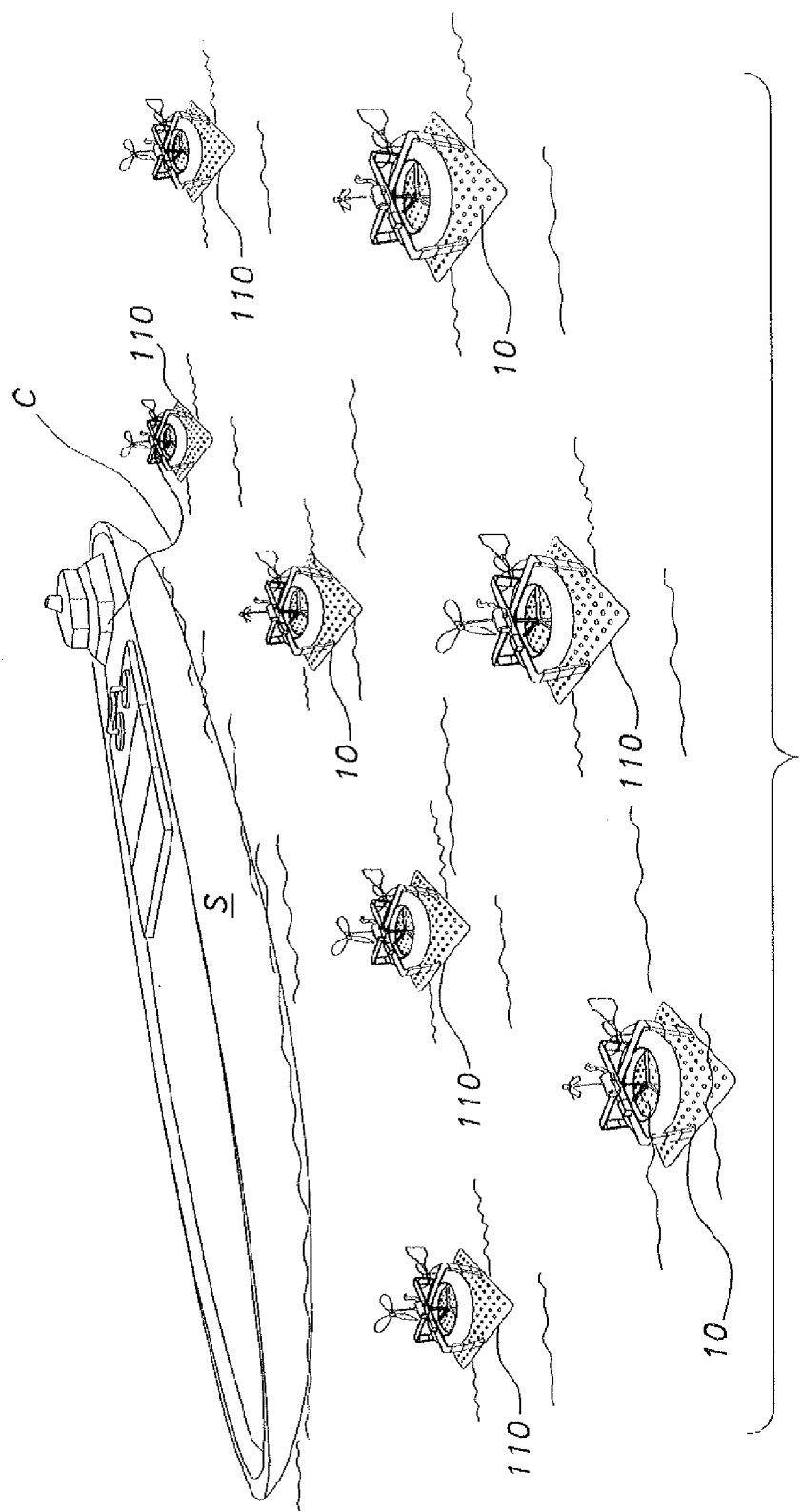
FIG. 4 is an environmental perspective view of a plurality of water aeration systems using renewable energy sources according to the present invention, illustrating their deployment in a body of water.

The water aeration system using a renewable energy source is a self-contained system that may be deployed in virtually any body of water to provide automatic aeration of at least the upper stratum of the water. FIGS. 1 and 2 of the drawings provide views showing details of a first embodiment of the aeration system 10. FIG. 3 illustrates a second embodiment of the aeration system 110. The two embodiments differ only in the means used to obtain the renewable energy used to power each device. FIG. 4 is an illustration showing the deployment of a series of such aeration systems 10, 110 in a relatively large body of water.

The aeration system 10, 110 includes an aerator frame 12 having an upper portion 14 and an opposite lower portion 16. The frame 12 may be a relatively simple and lightweight structure, comprising a pair of mutually orthogonal upper crossmembers having a vertical arm depending from the ends of each of the crossmembers. The lower portions and ends of the arms comprise the lower portion 16 of the frame 12. The frame 12 shown in the drawings is exemplary, and other frame configurations may be used. A diffuser plate 18 is attached to the lower portion 16 of the frame 12, i.e., to the lower extremities of the vertical arms of the frame 12. The plate 18 spans the lateral extent of the frame 12. The diffuser plate 18 includes a large number of relatively small perforations 20 therethrough. The perforations 20 serve to break up the aeration bubbles produced by the aeration system 10, 110 to form myriad small bubbles for more efficient aeration. While the diffuser plate 18 is shown as a substantially square sheet of material, it will be seen that the plate 18 may be circular or any other shape.

A vertical column comprising an air delivery pipe or tube 22 extends from below the center of the diffuser plate 18 through the center of the upper portion 14 of the frame 12. The column or air delivery tube 22 serves to convey air to a dispensing nozzle 30 below the diffuser plate 18, and also serves as an attachment structure for a float 26. The float 26 may be toroidal, as shown, or any other practicable shape. The attachment of the float 26 to the medial portion of the column or air delivery tube 22 places the float within the volume defined by the upper and lower portions 14 and 16 of the frame 12 and the vertical arms.

The air delivery tube or pipe 22 has a lower end 28 extending below the diffuser plate 18, and an air dispensing nozzle or fitting 30 installed thereon. The opposite upper end 32 of the tube or pipe 22 extends through the center of the upper portion 14 of the frame 12, and connects to and communicates pneumatically with an electrically powered air pump 34 installed atop the frame 12. The air pump 34 is a conventional unit combining an electric motor that is mechanically connected to an air pump to operate the air pump when electrical power is supplied to the motor. Air is drawn into the system through an air inlet 36. The air pump 34 then pumps the air downward through the central air tube 22 to exit the nozzle 30 beneath the diffuser plate 18.

Electrical power for the motorized air pump assembly 34 may be provided by one or more solar cells 38 deployed above the remainder of the structure, as shown in the system 10 of FIGS. 1 and 2, or alternatively by a wind generator or wind turbine 138, as shown in the system 110 of FIG. 3. The provision of either solar cells 38 for the embodiment 10 of FIGS. 1 and 2, or a wind generator 138 as in the embodiment 110 of FIG. 3, is the only difference between the two systems 10 and 110. All other components, e.g., the frame 12, the diffuser plate 18, the central air delivery tube 22, the air pump 34, etc., are the same in both embodiments. An electrical storage battery 40 may be provided to supply electrical power to the pump 34 during periods when no renewable energy (light or wind) is available, or to store any surplus electrical power produced by the solar cells 38 or wind generator 138. An auxiliary power receptacle 42 may also be provided to enable the aeration system 10, 110 to be powered by some external power source, if required.

The water aerator system 10, 110 is configured for substantially autonomous operation. Accordingly, it is important to provide means for indicating the status and condition of the device to a distant observer, without the need to actually visit or travel to the device periodically. One potential problem with any buoyant object is the possibility of damage to the float for some reason or another. Accordingly, the aerator 10 may include buoyancy level indicators 44 disposed upon the arms of the frame 12. These indicators 44 may be provided in the form of sleeves over the arms, or may be painted, taped, or otherwise marked on the arms. The indicators 44 may comprise different colors to indicate the relative buoyancy of the device, or they may comprise other markings, numbers, etc.

A light 46 may be provided atop the system to alert personnel as to the condition of the device. For example, the light may be wired using simple conventional circuitry to illuminate when insufficient renewable energy is being received to operate the motor and pump 34 and electrical energy is being drawn from the on-board battery 40. Such a circuit is analogous to the well-known low voltage warning light circuit commonly found in automobiles. So long as sufficient electrical energy is being supplied by the solar cells 38 or wind generator 138, the battery 40 is off-line and the light 46 is dark. Any excess electrical power generated by the solar cells 38 or wind generator 138 may be used to recharge the on-board battery 40.

Alternatively, the water aeration systems 10 and/or 110 may receive electrical power from an external source, if desired. FIG. 4 illustrates such a scenario, where one of the wind generator embodiments of the aerator systems is receiving electrical power from a ship S by means of an electrical cable C. The cable C connects to the external auxiliary power receptacle 42 provided in each system 10 and 110, as noted further above. Under certain circumstances, excess electrical power may be produced by the solar cells 38 or wind generator 138. This excess power may be delivered back to the ship S by the cable C when this occurs.

Other electrical devices may be added to the aerator systems 10 and 110 if sufficient electrical power is provided. For example, an electrically powered propeller 52 and rudder 54 may be installed. The aerators 10 and 110 may include conventional GPS receivers and position sensing devices, as are commonly provided in relatively inexpensive personal electronic devices. Automated programming may be interfaced with such systems or devices in order to operate their propellers 52 and rudders 54 for station keeping at a given site, or to maneuver the aerator systems 10 and 110 from one position to another at predetermined times, or as directed by remote control. A larger electrical storage battery, or more batteries, may be provided if a motorized propeller and rudder are added that accordingly require greater electrical power.

It is to be understood that the present invention is not limited to the embodiments described above, but encompasses any and all embodiments within the scope of the following claims.

I claim:

1. A water aerator system, comprising:
   an aerator frame;
   an air pump disposed atop the aerator frame;
   a renewable energy power generator disposed atop the aerator frame, the power generator providing power to the air pump;
   a float disposed within the aerator frame;
   an air dispensing nozzle disposed beneath the aerator frame, the air dispensing nozzle communicating pneumatically with the air pump; and
   an auxiliary electrical power receptacle disposed upon the aerator frame.

2. The water aerator system according to claim 1, wherein the aerator frame has an upper portion and a lower portion opposite the upper portion and the float is toroidal, the float being disposed generally medially within the aerator frame, the system further comprising an air delivery tube disposed concentrically within the float, the air delivery tube having an upper end and a lower end opposite the upper end, the upper end of the air delivery tube communicating pneumatically with the air pump, the air dispensing nozzle being attached to the lower end of the air delivery tube.

3. The water aerator system according to claim 1, wherein the aerator frame has an upper portion and a lower portion opposite the upper portion and the float is disposed generally medially within the aerator frame, the system further comprising a perforated diffuser plate disposed across the lower portion of the aerator frame, the air dispensing nozzle being disposed beneath the diffuser plate.

4. The water aerator system according to claim 1, further comprising a renewable energy power generator connected to the air pump, the renewable energy power generator being selected from the group consisting of solar panels and wind generators.

5. The water aerator system according to claim 1, further comprising:
- an electric storage battery disposed upon the aerator frame; and
- an electric light disposed above the aerator frame, the light communicating electrically with the electric storage battery.

6. The water aerator system according to claim 1, further comprising a plurality of buoyancy level indicators disposed upon the aerator frame.

7. A water aerator system, comprising:
- an aerator frame having an upper portion and a lower portion opposite the upper portion;
- an air pump disposed atop the aerator frame;
- a toroidal float disposed generally medially within the aerator frame;
- an air delivery tube disposed concentrically within the float, the air delivery tube having an upper end communicating pneumatically with the air pump and a lower end extending below the lower portion of the aerator frame;
- an air dispensing nozzle attached to the lower end of the air delivery tube, the nozzle communicating pneumatically with the air delivery tube; and
- a plurality of buoyancy level indicators disposed upon the aerator frame.

8. The water aerator system according to claim 7, further comprising a renewable energy power generator disposed atop the aerator frame, the power generator providing power to the air pump.

9. The water aerator system according to claim 8, wherein the renewable energy power generator is selected from the group consisting of solar panels and wind generators.

10. The water aerator system according to claim 7 further comprising a perforated diffuser plate disposed across the lower portion of the aerator frame, the air dispensing nozzle being disposed beneath the diffuser plate.

11. The water aerator system according to claim 7, further comprising an auxiliary electrical power receptacle disposed upon the aerator frame.

12. The water aerator system according to claim 7, further comprising:
- an electric storage battery disposed upon the aerator frame; and
- an electric light disposed above the aerator frame, the light communicating electrically with the electric storage battery.

13. A water aerator system, comprising:
- an aerator frame having an upper portion and a lower portion opposite the upper portion;
- a float disposed generally medially within the aerator frame;
- a perforated diffuser plate disposed across the lower portion of the aerator frame an air pump disposed atop the frame;
- a renewable power generator connected to the air pump, the renewable power generator being selected from the group consisting of solar panels and a wind generator;
- an air tube extending from the air pump through the frame and the diffuser plate;
- an air dispensing nozzle attached to the air tube beneath the diffuser plate;
- an auxiliary electrical power receptacle disposed upon the aerator frame;
- an electric storage battery disposed upon the aerator frame; and
- an electric light disposed above the aerator frame, the light communicating electrically with the electric storage battery.

14. The water aerator system according to claim 13, further comprising a plurality of buoyancy level indicators disposed upon the aerator frame.

15. The water aerator system according to claim 13, wherein the renewable power generator comprises a plurality of solar panels.

16. The water aerator system according to claim 13, wherein the renewable power generator comprises a wind generator.

* * * * *